M. NEMES.
SQUEEZING AND PRESSING DEVICE.
APPLICATION FILED FEB. 3, 1912.
1,026,696.
Patented May 21, 1912.
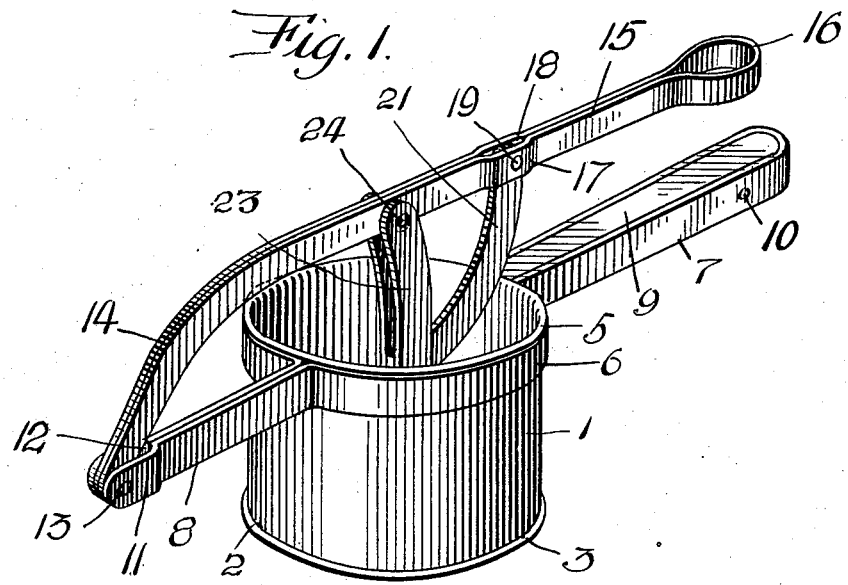
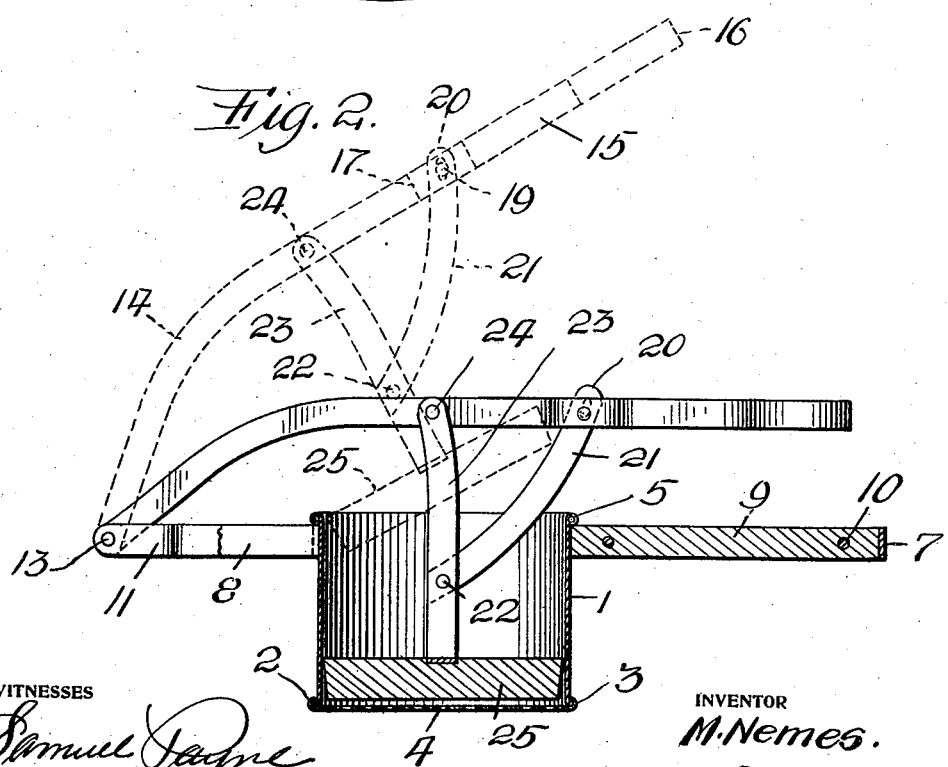

UNITED STATES PATENT OFFICE.

MIKE NEMES, OF FORT DODGE, IOWA.

SQUEEZING AND PRESSING DEVICE.

1,026,696.

Specification of Letters Patent. Patented May 21, 1912.

Application filed February 3, 1912. Serial No. 675,264.

*To all whom it may concern:*

Be it known that I, MIKE NEMES, a subject of the King of Hungary, residing at Fort Dodge, in the county of Webster and State of Iowa, have invented certain new and useful Improvements in Squeezing and Pressing Devices, of which the following is a specification, reference being had therein to the accompanying drawing.

This invention relates to a squeezing and pressing device, and the primary object of my invention is the provision of simple and effective means for squeezing, pressing and disintegrating fruits, vegetables and other matter, in order to obtain the juice, syrup or the matter in a pulverized, granular or fine form.

Another object of this invention is to provide a device of the above type consisting of comparatively few parts that are inexpensive to manufacture, durable and highly efficient for culinary purposes.

I attain the above objects by a mechanical construction that will be hereinafter specifically described and then claimed, and reference will now be had to the drawing, wherein:—

Figure 1 is a perspective view of the device, and Fig. 2 is a longitudinal sectional view of the same.

A device in accordance with this invention comprises a cylindrical shell 1 having the lower edges thereof provided with an annular flange 2 upon which is reamed or otherwise mounted the flanged edge 3 of a perforated bottom plate 4, said plate and said shell constituting a receptacle to receive the matter to be squeezed or pressed. The upper edges of the shell 1 are reamed or provided with a wire edge, as at 5 and surrounding the upper end of said shell is a two-part holder, comprising semi-cylindrical bands 6, a handle 7 and a bracket 8. These three last mentioned elements 6, 7 and 8 are preferably made of a single piece of material that is bent or shaped to support the shell 1. Mounted in the handle 7 is a filler block 9 that is retained therein by transverse rivets 10 or other fastening means, and the outer end of the bracket 8 is off-set, as at 11 to provide a bifurcation or slot 12.

Pivotally mounted in the outer end of the bracket by a transverse pin 13 is the curved end 14 of an operating lever 15, said lever also being made of a single piece of material that is bent upon itself to form a hand piece 16 directly above the handle 7. The material forming the lever 15 is off-set, as at 17 to provide a slot 18, and pivotally mounted in said slot by a transverse pin 19 is the slotted end 20 of a curved brace 21. The lower end of the brace 21 is pivotally mounted by a transverse pin 22 between the arms 23 that have the upper ends thereof pivotally connected by a pin 24 to the sides of the lever 15. The lower ends of the arms 23 are integral and are suitably connected to a circular presser plate 25 arranged within the shell 1. The slotted end 20 of the brace 21 permits of the lever 15 being easily elevated to raise the presser block 25 and position the same at an angle relatively to the shell 1, whereby easy access can be had to the shell for placing a vegetable therein.

By holding the handle 7 in one hand and using the thumb in connection with the lever 15, the lever 15 can be drawn toward the handle 7 by closing the hand, thereby squeezing and pressing a vegetable within the shell 1 to the extent that juice is extracted from the vegetable or the vegetable crushed and pulverized.

From the foregoing it will be observed that the device can be made of light and durable metal, of various sizes, and it is an extremely easy matter to manipulate the same. It can be easily cleansed and maintained in a sanitary condition and used for various purposes.

What I claim is:—

1. A squeezing and pressing device comprising a receptacle having a perforated bottom, a holder made of a single piece of material clamped upon the upper end of said receptacle and providing a handle and a bracket, a lever pivotally connected to said bracket, arms pivotally connected to said lever and extending into said receptacle, a presser head carried by said arms within said receptacle, and a curved brace pivotally connected to said arms and loosely connected to said lever.

2. A squeezing and pressing device comprising a receptacle having a perforated bottom, a holder made of a single piece of material and clamped upon the upper end of said receptacle to provide a handle and a bracket longitudinally alining with said handle, a lever pivotally connected to the bracket of said holder, arms pivotally connected to said lever and extending into said receptacle, a presser head carried by said arms within said receptacle, and a curved brace pivotally mounted between said arms and loosely mounted in said lever.

In testimony whereof I affix my signature in the presence of two witnesses.

MIKE NEMES.

Witnesses:
JOE STEINBERG,
L. DRENKO.

Copies of this patent may be obtained for five cents each, by addressing the "Commissioner of Patents, Washington, D. C."